United States Patent
Eslambolchi et al.

(10) Patent No.: US 7,558,858 B1
(45) Date of Patent: Jul. 7, 2009

(54) HIGH AVAILABILITY INFRASTRUCTURE WITH ACTIVE-ACTIVE DESIGNS

(75) Inventors: Hossein Eslambolchi, Los Altos Hills, CA (US); John McCanuel, Bailey, CO (US); Prakash Vasa, Clarksburg, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 567 days.

(21) Appl. No.: 11/216,984

(22) Filed: Aug. 31, 2005

(51) Int. Cl.
*G06F 15/173* (2006.01)

(52) U.S. Cl. ............... 709/226; 709/223; 709/228; 709/241; 709/244

(58) Field of Classification Search ........... 709/223, 709/229, 238
See application file for complete search history.

(56) References Cited

U.S. PATENT DOCUMENTS

| | | | |
|---|---|---|---|
| 6,618,709 B1 * | 9/2003 | Sneeringer | 705/412 |
| 6,732,123 B1 | 5/2004 | Moore et al. | |
| 6,779,016 B1 * | 8/2004 | Aziz et al. | 709/201 |
| 6,950,848 B1 * | 9/2005 | Yousefi'zadeh | 709/203 |
| 7,043,563 B2 * | 5/2006 | Vange et al. | 709/245 |
| 7,146,353 B2 * | 12/2006 | Garg et al. | 707/2 |
| 7,174,390 B2 * | 2/2007 | Schulter et al. | 709/245 |
| 7,178,059 B2 * | 2/2007 | Greenspan et al. | 714/13 |
| 7,370,336 B2 * | 5/2008 | Husain et al. | 719/328 |
| 2001/0052016 A1 | 12/2001 | Skene et al. | |
| 2002/0156612 A1 | 10/2002 | Schulter et al. | |
| 2003/0154282 A1 * | 8/2003 | Horvitz | 709/226 |
| 2003/0172145 A1 * | 9/2003 | Nguyen | 709/223 |
| 2004/0153545 A1 * | 8/2004 | Pandya et al. | 709/226 |
| 2004/0181707 A1 | 9/2004 | Fujibayashi | |
| 2004/0236987 A1 | 11/2004 | Greenspan et al. | |
| 2005/0060432 A1 | 3/2005 | Husain et al. | |

* cited by examiner

*Primary Examiner*—Michael Won
(74) *Attorney, Agent, or Firm*—Hoffman & Baron, LLP

(57) ABSTRACT

Methods and systems for managing a multi-tiered computer infrastructure. The infrastructure includes a plurality of functional layers, wherein one of the layers is a resource allocation layer. Each functional layer includes a set of resources that are substantially interchangeable with other resources in the same layer and adapted to be able to operate with any resource in an adjacent layer. The resource allocation layer receives and manages information regarding the status of the resources and allocates the resources to a task in accordance with utilization levels and operability of any particular resource.

10 Claims, 2 Drawing Sheets

HIGH AVAILABILITY INFRASTRUCTURE WITH ACTIVE-ACTIVE DESIGNS

BACKGROUND OF THE INVENTION

1. Field of the Invention

The present invention relates to computing systems for enterprises and, more specifically, to disaster recovery systems and techniques for reconfigurable, virtualized processing systems.

2. Discussion of Related Art

In a conventional computer network disaster recovery system, storage facility x is located at a first location, and storage facility y is located at a second location, typically remote from the first location. Facility x may be considered a primary site (i.e., production site) and facility y may be considered as a secondary or fail-over site (i.e., disaster recovery site). Each facility has an identical copy of the data of interest. Any desired updates of data at the primary site are also sent to the secondary site. In this fashion, the primary and secondary facilities maintain identical copies of data.

If a disaster were to happen at the primary site (e.g., a hurricane), computer operations are typically relocated or fail-over to the secondary site. The secondary site has a host computer waiting to handle such fail-over requests and is pre-configured with the necessary applications (e.g., those that exist on the primary host). The secondary site, including its host, may then handle the enterprise's computer operations that were handled by the primary site. When the primary site recovers, the operations may switch back to the primary site if desired.

In a typical multi-tiered application topology, a firewall acts as an interface to the Internet, for example, to receive various requests therefrom. The firewall communicates with a load balancer, which attempts to distribute the processing load among a multiplicity of processing nodes. For example, the load balancer may distribute requests among a multiplicity of web servers a . . . n. Each web server, in turn, may perform some analysis of the task it receives and invokes an appropriate application server a . . . n. Each application server may in turn interact with a database or file server a . . . n. Each of the various entities may be executing on its own respective processing or server node.

Modern multi-tiered application topologies may become very complicated. Adding to the complication are the various hubs, switches, cabling, and the like necessary to create the processing network. Moreover, various versions of software may be executing.

To date, a considerable body of expertise has been developed in addressing disaster recovery with specific emphasis on replicating the data. Processor-side issues have not received adequate attention.

To date, processor-side aspects of disaster recovery have largely been handled by requiring processing resources on the secondary site to be identical to those of the first site and to wait in standby mode. This is complicated and costly, as suggested by the complexity of the multi-tiered architecture. Moreover, modern processor networks are often changed for a variety of reasons. If such a network is a primary site network, then the changes also need to be made to the secondary site, or else the enterprise risks that its disaster recovery system will not work as expected.

Accordingly, there remains a need for an efficient and cost-effective method of managing enterprise computer systems in preparation for hardware and/or software failures.

SUMMARY OF THE INVENTION

In one embodiment, the present invention is a system for managing a multi-tiered computer infrastructure. The system comprises a plurality of functional layers and a resource allocation layer. Each functional layer comprises a set of resources. Each of the resources is operable with a plurality of resources in another functional layer. The resource allocation layer is operatively coupled to at least one functional layer. The resource allocation layer monitors a status of the resources and allocates the resources to a task based on the status.

Preferably, the resource allocation layer is the topmost layer of the infrastructure. Preferably, the resource allocation layer monitors a utilization of the resources. Examples of resources include a server, an application, software, a database and a storage medium. The set of resources in one of the plurality of functional layers can be located at different geographic locations.

In another embodiment, the invention is a method of allocating a computer resource. The method comprises providing a system for managing a multi-tiered computer infrastructure comprising a plurality of functional layers wherein each functional layer comprises a set of resources, wherein each of the resources is operable with a plurality of resources in another functional layer, and a resource allocation layer operatively coupled to at least one functional layer which monitors a status of the resources and allocates the resources to a task based on the status; sending information pertaining to a client request to the resource allocation layer; providing the status of resources in the infrastructure; and allocating resources to process the request according to the status of the resources. If the status of a first resource in a layer is determined to be invalid, then a valid resource in the layer is reallocated to process the request.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE INVENTION

The present invention is a system and method by which to allocate system resources in an efficient and cost-effective manner, especially for use during fail-over situations and disaster recovery situations.

The system of the present invention is a multi-tiered computer infrastructure. The infrastructure comprises layers arranged hierarchically. Each layer preferably has a specific function. For example, there can be database layers, application layers, object model layers, bulk data processing layers, and the like.

Each functional layer includes a set of a particular type of resource by which to perform its designated function. Resources can be hardware, software and/or a combination of hardware and software. For example, resources can include servers, applications, database management systems, databases, and storage media.

Before the present invention, computer systems and architecture were designed in such a manner that specific components at each level of the architecture were only compatible with particular designated components in other levels. For example, a particular application server included dependencies to a particular database. That is, due to certain peculiarities associated with the database, a particular server was designated to be used exclusively with a particular database, i.e., a different application server would not be functional.

Figure 1:
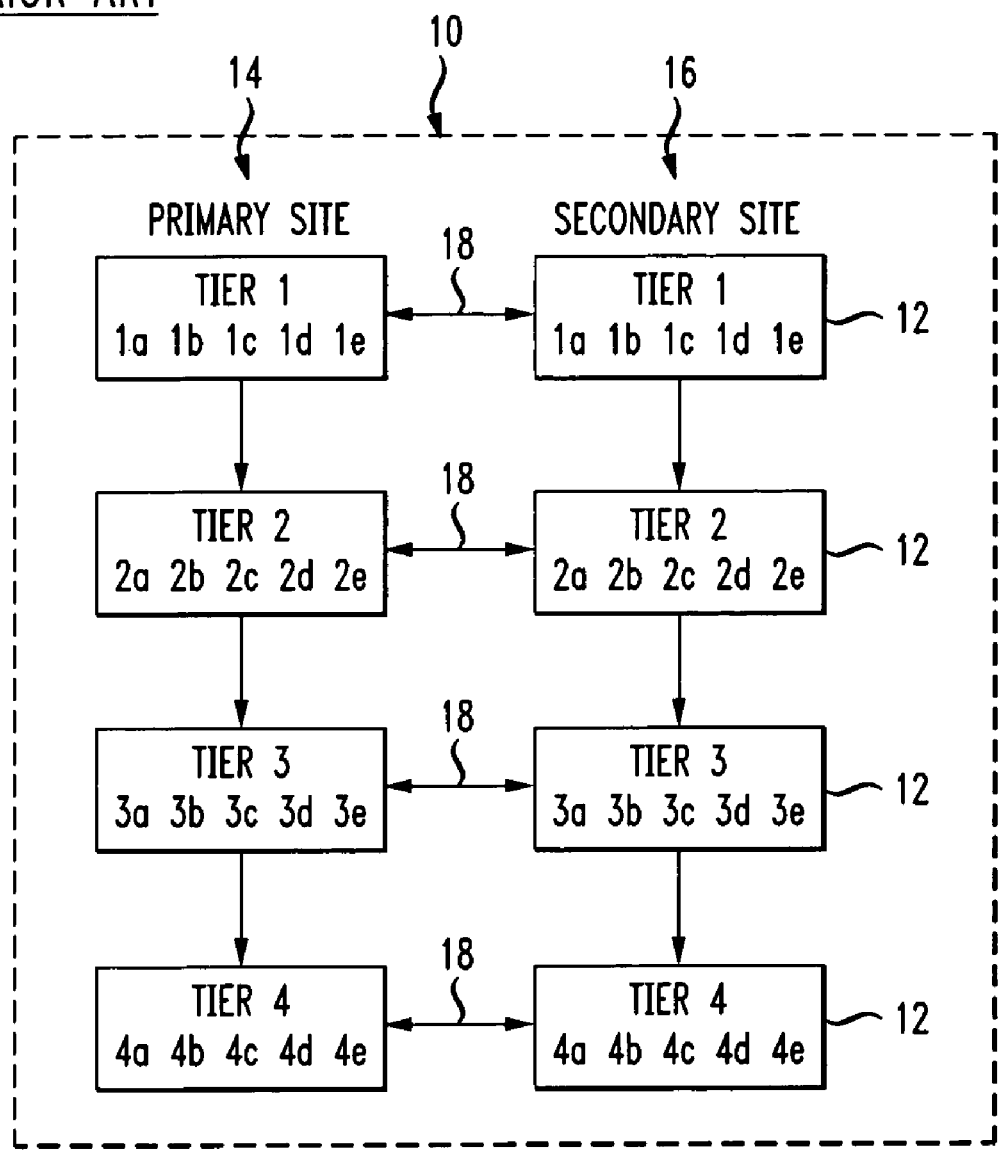
FIG. 1 is a block diagram of a conventional multi-tiered network infrastructure. The tiers or layers are labeled 1 through 4. The topology of this infrastructure includes a Primary Site and a remotely-located Disaster-Recovery Site. The number/letter combinations represent resources. Resources with the same number are of the same type. Resources with the same letter are compatible with each other. The arrows connecting the Primary Site to the Disaster Site indicate that if the Primary Site fails, all of the operations are sent to the Disaster Site.

FIG. 1 shows a typical prior art multi-tiered network topology 10. The tiers 12 are labeled 1 through 4. Each letter-number combination associated with a tier in FIG. 1 represents a resource. Combinations within one tier represent one resource type. Thus, for example, combinations 1a through 1e represent one type of resource, combinations 2a through 2e represent another type of resource, etc. Specifically, 2a through 2e in tier 2 may all be servers; and 3a through 3e may all be databases. As explained above, not all the resources within a tier are compatible with all the resources in another tier. Thus in FIG. 1, only resources with the same letter are compatible. For example, resource 1a is only compatible with resource 2a; resource 3b is only compatible with resource 4b; resource 2e is only compatible with resource 3e; etc.

FIG. 1 also depicts the typical manner in the prior art by which to handle fail-over situations. A fail-over situation is a backup operation that automatically switches to a standby database, server or network if the primary system fails or is temporarily shut down for servicing.

FIG. 1 depicts the Primary Site 14 and a remotely-located Disaster Site or Secondary Site 16. The arrows 18 connecting the Primary Site to the Disaster Site indicate that if the Primary Site fails, all of the operations are switched to the Disaster Site. Due to the dependencies between resources at either site, failure of a site may occur in response to failure of any resource at any tier of that site.

In the present invention, the peculiarities or dependencies that would have necessarily associated a particular resource in a certain layer with a designated resource in another layer have been removed. That is, instead of the one-to-one relationship-based infrastructure of the prior art, the present invention is a component level based infrastructure (i.e., a many-to-many relationship-based infrastructure). Thus, each software and hardware component can operate, obtain resources, and be accessed as needed.

For example, the peculiarities that would have required a particular server to be used with a particular database have been removed in order to make the servers generic, i.e., any server can be used with any database. Database-specific functions are preferably removed from the applications and included in the databases to enable the databases to appear generic to servers and applications.

Accordingly, all resources in a particular layer are substantially equivalent, i.e., generic. Thus, each resource in a particular layer is substantially interchangeable with another resource in the same layer.

Consequently, each resource in a particular layer is preferably compatible, i.e., operable, with each resource in another layer, typically in an adjacent layer. That is, each resource in a particular layer can be utilized by each resource in another layer. For example, each server in a particular layer is compatible with each database on a lower layer. Thus, multiple servers are available for use with each database.

Figure 2:
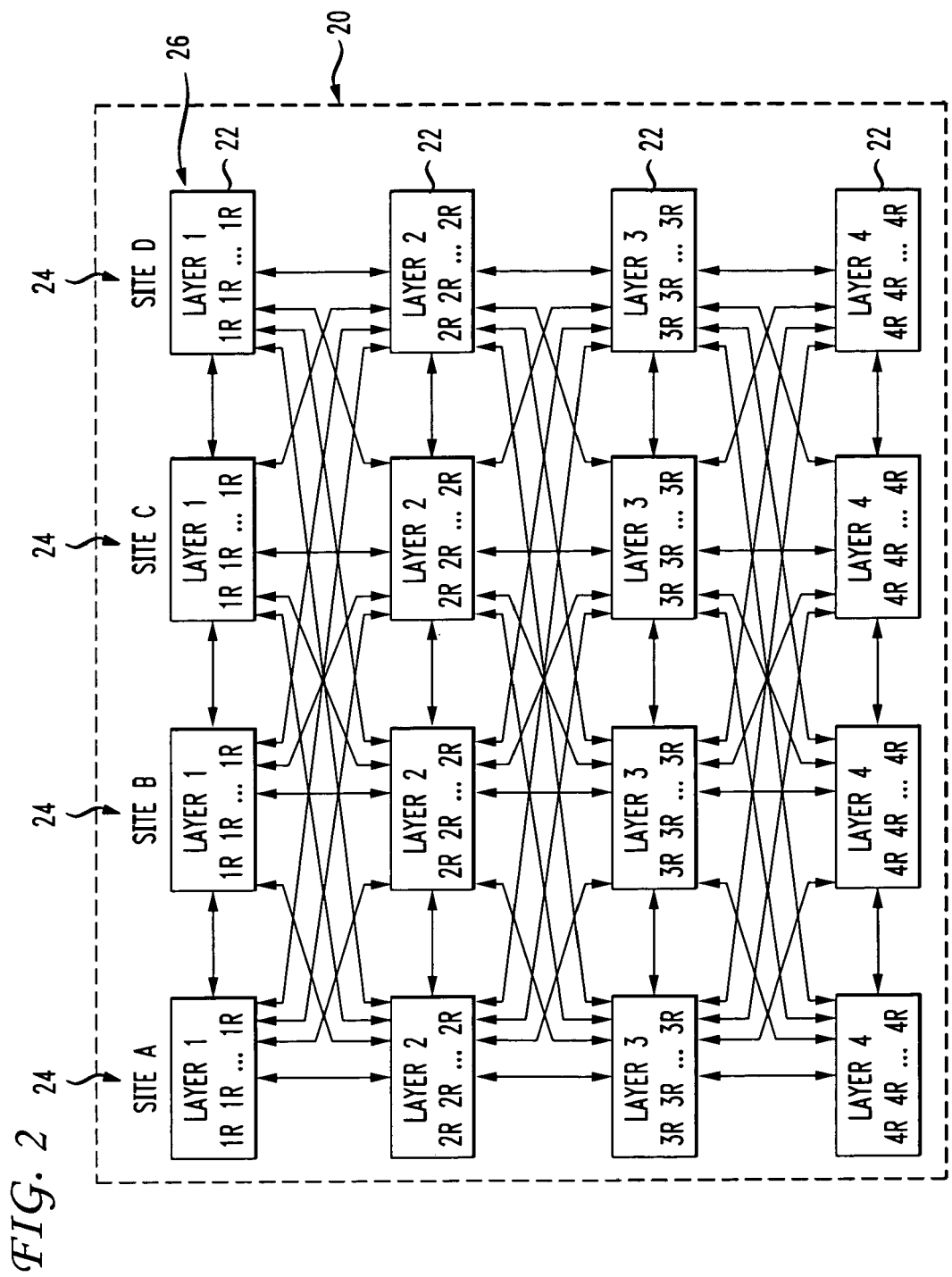
FIG. 2 is a block diagram of a multi-tiered computer infrastructure in accordance with the present invention. The tiers, or layers, are labeled 1 through 4. The topology of this infrastructure includes four different sites, which may or may not be located at different physical locations, labeled A through D. The number/R combinations represent resources. Resources 1R are equivalent with each other; resources 2R are equivalent with each other; resources 3R are equivalent with each other; and resources 4R are equivalent with each other. Each resource in each layer is operable with each resource in an adjacent layer. The arrows connecting each layer to an adjacent layer in each of the other sites indicates that if any resource at any site fails, operations can be sent to an adjacent layer in any other site.

FIG. 2 depicts a multi-tiered computer infrastructure 20 in accordance with the present invention. The layers 22 are labeled 1 through 4. This topology includes four different sites 24 labeled A through D. These sites can be at the same physical location or can be remote from one another.

All of the resources in an individual layer are substantially equivalent. The number/R combinations in FIG. 2 represent resources. For example, all the resources in layer 1 are 1R; all of the resources in layer 2 are 2R, etc. As explained above, each resource in each layer is operable with each resource in an adjacent layer. For example, resource 1R is compatible with resource 2R; resource 3R is compatible with resource 4R; etc. The arrows between the layers indicate that if any resource at any site fails, its operations can be redirected to another resource in the same layer at any other site.

One of the layers of the infrastructure is a resource allocation layer (RAL). Preferably, the RAL 26 is the topmost layer. This layer receives input regarding the status of the resources within the infrastructure. Based on a set of business rules, the RAL determines the utilization and allocation of system resources. Business rules are guides for the allocation of resources and include specific priority calls or designations to aid in infrastructure management.

An example of a business rule is that a particular resource type always be available. Another example of a business rule is that a software module(s) cannot have a maintenance window from a user point of view. That is, there needs to be an instance of the software running on the infrastructure even during new software loads. In such cases, the old version of the software would continue to service requests until the new version is available for service. Thus, the funneling of all the service requests to the new version, as soon as it is ready for service, is completely automated. Such automation can include a procedure to take down the old version once the new version is servicing the request. A rule can also be included to ensure that there is no loss of request/data in execution while taking down the old software version.

In particular, the RAL receives and manages information regarding which resources are invalid. A resource is invalid if it is unavailable, non-optimal, or over-utilized. A resource may be unavailable, for example, because it is currently in use, because it is malfunctioning, or because it is reserved. Based on this information, the RAL allocates resources to a particular task. If a resource is invalid, the RAL substitutes the Domain Name System (DNS) Internet Protocol (IP) address of a valid resource for the IP address of the invalid resource. The DNS is an Internet service that translates domain names into IP addresses. IP specifies the format of packets over the Internet. The RAL also maintains a record of all changes in allocation, as well as the current status of all resources as being allocated or not.

For example, if a particular server goes down, the RAL will dynamically connect the database to another server. For instance, if server 1 goes down, then a particular query may be rerouted to server 2. If server 2 cannot come up, then the query may be rerouted to server 3, etc. Thus, denial of service to the requesting client is substantially reduced or eliminated.

Other examples of problems that can be addressed by the systems of the present invention include loss of power; and problems related to storage disks, cpu's, and memory including unexplained problems related to software which do not respond due to fatal kernel problems at the operating system level and do not constitute a software bug.

Changing the allocation of a resource can also be used to optimize overall or localized performance. For example, if the RAL detects that the size of an incoming query is inordinately large, the RAL can dynamically reallocate underutilized resources to process the query.

The ability to allocate or reallocate resources by the RAL has no geographic boundaries. However, business rules may be used which dictate where a new instance of software receives its allocated resources. For example, if the infrastructure has global presence with multiple sites in the Americas; Europe, Middle East and Africa region (EMEA); and Asia Pacific region (AsiaPac), it may be preferable to allocate resources local to these particular regions.

An example of functional layers that include both software and hardware, with which the methods and systems of the present invention may be implemented, follows. The lowest layer is the ETL Layer. ETL is short for extract, transform and load. These three database functions are combined into one function to pull data out of one database and place it into another database. The next layer is the Data Tier Layer, which includes databases. The next layer is the Middleware Layer. The Middleware Layer includes an object model program such as Java™ 2 Platform, Enterprise Edition (J2EE™). The topmost layer is a Resource Allocation Layer. Between these layers are various layers which incorporate servers.

An example of functional layers that include software only, with which the method and system of the present invention may be implemented, is provided in U.S. patent application Ser. No. 11/239,832, filed Sep. 30, 2005, entitled "Tiered and Modular Approach to Operational Support Systems," which is incorporated herein by reference in its entirety.

In another embodiment, the invention is a method for providing alternate resources to a client in response to a fail-over condition. The method comprises providing the multi-tiered computer infrastructure defined above.

The infrastructure receives a request (e.g., a query) from a client. Information regarding the request is sent to the RAL. The status of resources maintained by the RAL is assessed. Based on the validity of resources, the RAL allocates resource(s) to the task(s) pertaining to the request.

For example, if a first resource in a particular layer is unavailable, the RAL preferably reroutes the task(s) to a second resource in the same layer. If the second resource is also unavailable, then the task(s) is rerouted to a third resource in the same layer, and so on.

One advantage of the systems and methods formed in accordance with the present invention is that the physical location of the resources are inconsequential. A resource can be at a local or remote site. For example, in FIG. 2, four sites are shown. These sites can all be in the same physical location, remotely located from one another, or any combination of locations.

Regardless of their physical location, the resources of each layer are preferably regarded as one pool of resources, i.e., one virtual place, from which any particular resource may be chosen. Accordingly, a resource at any layer is available to any site at any time. If there are 50 servers across two locations, distributed 30:20, the overall available resource pool is 50.

For example, regardless of their physical location, one application server and another application server make one pool of two servers; one bulk data processor and another bulk data processor make one pool of two bulk data processors; etc. An application itself could be running across separate locations using any one or more resources in the pool.

EXAMPLES

The following examples illustrate scenarios in which the method and system in accordance with the present invention may be implemented.

1. Application module(s) running at high CPU/memory utilization could be supplemented with additional CPU/memory allocation, thereby allowing such application module(s) to handle a greater volume of work.

2. The application module(s) can handle the traffic, but database is running at high CPU/memory utilization. In this scenario, the infrastructure of the present invention would preferably redirect new requests to a secondary or tertiary copy of the database to do active load balancing.

3. To facilitate item 1 above, the infrastructure would either allocate the additional capacity from available CPU/memory, or could take another application down or reduce its foot print, which is the amount of disk space required by the application. Such actions have little or no traffic impact. Thus, the system and method of the present invention can facilitate operation of the infrastructure using a reduced resource allocation.

Although preferred embodiments of the present invention have been described herein with reference to the accompanying drawings, it is to be understood that the invention is not limited to those precise embodiments and that various other changes and modifications may be effected herein by one skilled in the art without departing from the scope or spirit of the invention, and that it is intended to claim all such changes and modifications that fall within the scope of the invention.

The invention claimed is:

1. A system for managing a multi-tiered computer infrastructure comprising:
    a plurality of functional layers including a middleware layer, a data tier layer and an extract-transform-load layer, each functional layer comprising a set of resources, each of said resources being operable with a plurality of resources in another functional layer; and
    a resource allocation layer operatively coupled to at least one functional layer of the plurality of functional layers, said resource allocation layer being a topmost layer of the multi-tiered computer infrastructure and operable to:
        receive information pertaining to a client request;
        monitor a status of said resources of said plurality of functional layers; and
        allocate plural resources from said resources of said plurality of functional layers allocates said resources to a task to process said client request based on said status of said resources of said plurality of functional layers.

2. The system of claim 1 wherein said resources are selected from the group consisting of a server, an application, software, a database and a storage medium.

3. The system of claim 1 wherein said resource allocation layer monitors a utilization of said resources of said plurality of functional layers.

4. The system of claim 1 wherein said resources in one of said plurality of functional layers are located at different geographic locations.

5. A method of allocating a computer resource comprising:
   (a) providing a multi-tiered computer infrastructure comprising:
      a plurality of functional layers including a middleware layer, a data tier layer and an extract-transform-load layer, each functional layer comprising a set of resources, each of said resources being operable with a plurality of resources in another functional layer, and a resource allocation layer operatively coupled to at least one functional layer of the plurality of functional layers, said resource allocation layer being a topmost layer of the multi-tiered computer infrastructure;
   (b) receiving information pertaining to a client request at said resource allocation layer;
   (c) monitoring a status of said resources of said plurality of functional layers in said multi-tiered computer infrastructure at said resource allocation layer; and
   (d) allocating via said resource allocation layer plural resources from said resources of said plurality of functional layers to process said client request according to said status of said resources of said plurality of functional layers.

6. The method of claim 5 further comprising:
   determining whether a status of a resource in a functional layer of said plurality of functional layers is invalid;
   reallocating a valid resource in said functional layer to process said client request.

7. The method of claim 5 wherein said resources are selected from the group consisting of a server, an application, software, a database and a storage medium.

8. The method of claim 5 wherein said resource allocation layer monitors a utilization of said resources of said plurality of functional layers.

9. The method of claim 5 wherein said resources in one of said plurality of functional layers are located at different geographic locations.

10. The system of claim 1 wherein the resource allocation layer is further operable to:
   determine whether a resource in a functional layer of said plurality of functional layers is invalid; and
   reallocate a valid resource in said functional layer to process said request.

* * * * *